United States Patent
Narayanaswamy et al.

(10) Patent No.: US 8,619,614 B2
(45) Date of Patent: *Dec. 31, 2013

(54) DYNAMIC MONITORING OF NETWORK TRAFFIC

(75) Inventors: Krishna Narayanaswamy, San Jose, CA (US); Kannan Varadhan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,790

(22) Filed: Jan. 18, 2012

(65) Prior Publication Data

US 2012/0113857 A1   May 10, 2012

Related U.S. Application Data (63) Continuation of application No. 12/365,520, filed on Feb. 4, 2009, now Pat. No. 8,102,783.

(51) Int. Cl.
*H04L 12/26* (2006.01)
*H04L 12/28* (2006.01)
*H04L 12/54* (2006.01)
*G06F 15/173* (2006.01)

(52) U.S. Cl.
USPC ...... 370/252; 370/255; 370/392; 370/395.32; 370/428; 709/224; 709/246

(58) Field of Classification Search
USPC ............... 370/252, 254, 255, 389, 390, 392, 370/395.31, 395.32, 401, 412, 428–429; 709/203, 224, 246
See application file for complete search history.

(56) References Cited

U.S. PATENT DOCUMENTS

| | | | |
|---|---|---|---|
| 5,544,161 A | 8/1996 | Bigham et al. | |
| 6,182,146 B1 * | 1/2001 | Graham-Cumming, Jr. . | 709/238 |
| 6,650,641 B1 | 11/2003 | Albert et al. | |
| 7,385,924 B1 | 6/2008 | Riddle | |
| 7,424,744 B1 | 9/2008 | Wu et al. | |
| 7,554,983 B1 | 6/2009 | Muppala | |
| 7,577,758 B2 | 8/2009 | Ricciulli | |
| 7,606,160 B2 | 10/2009 | Klinker et al. | |
| 7,610,624 B1 | 10/2009 | Brothers et al. | |
| 7,656,812 B2 | 2/2010 | Tadimeti et al. | |
| 7,804,787 B2 | 9/2010 | Brandyburg et al. | |
| 7,822,038 B2 * | 10/2010 | Parker et al. ............... | 370/392 |
| 7,853,689 B2 * | 12/2010 | Enderby .................... | 709/224 |
| 7,898,943 B2 | 3/2011 | Yan | |
| 8,102,783 B1 | 1/2012 | Narayanaswamy et al. | |
| 8,351,426 B2 * | 1/2013 | Cadigan et al. ............ | 370/389 |
| 2001/0055274 A1 | 12/2001 | Hegge et al. | |
| 2002/0150081 A1 * | 10/2002 | Fang ........................ | 370/352 |
| 2003/0046388 A1 * | 3/2003 | Milliken ................... | 709/224 |

(Continued)

*Primary Examiner* — Candal Elpenord
(74) *Attorney, Agent, or Firm* — Harrity & Harrity, LLP (57) ABSTRACT

A device, connected to a monitoring appliance, may include a traffic analyzer to receive a data unit and identify a traffic flow associated with the data unit. The device may also include a traffic processor to receive the data unit and information regarding the identified traffic flow from the traffic analyzer, determine that the identified traffic flow is to be monitored by the monitoring appliance, change a port number, associated with the data unit, to a particular port number to create a modified data unit when the identified traffic flow is to be monitored by the monitoring appliance, and send the modified data unit to the monitoring appliance.

20 Claims, 9 Drawing Sheets

(56) References Cited

U.S. PATENT DOCUMENTS

| | | | |
|---|---|---|---|
| 2003/0088694 A1* | 5/2003 | Patek et al. | 709/238 |
| 2004/0100972 A1 | 5/2004 | Lumb et al. | |
| 2004/0213232 A1* | 10/2004 | Regan | 370/390 |
| 2006/0023709 A1* | 2/2006 | Hall et al. | 370/389 |
| 2006/0037071 A1 | 2/2006 | Rao et al. | |
| 2006/0209835 A1 | 9/2006 | Sainomoto et al. | |
| 2006/0236370 A1* | 10/2006 | John et al. | 726/1 |
| 2006/0239273 A1 | 10/2006 | Buckman et al. | |
| 2007/0041332 A1 | 2/2007 | Jorgensen et al. | |
| 2007/0268903 A1 | 11/2007 | Nakagawa | |
| 2008/0310307 A1 | 12/2008 | Yeom | |

* cited by examiner

| TRAFFIC FLOW 410 | MIRROR 420 | PORT TRANSLATION 430 |
|---|---|---|
| HTTP | YES, I/F 5 | 80 |
| SIP | YES, I/F 6 | 5060 |
| SQL | YES, I/F 7 | 6000 |
| ⋮ | ⋮ | ⋮ |

| PORT NUMBER 710 | PROTOCOL 720 | DESTINATION 730 | TRAFFIC FLOW 740 |
|---|---|---|---|
|  |  |  |  |
|  |  |  |  |
|  |  |  |  |
|  |  |  |  |

DYNAMIC MONITORING OF NETWORK TRAFFIC

RELATED APPLICATION

This application is a continuation of U.S. patent application Ser. No. 12/365,520, filed on Feb. 4, 2009, the disclosure of which is incorporated by reference herein.

BACKGROUND

Many companies have invested in a variety of monitoring equipment to gain visibility into network and/or application usage, and to adhere to government stipulated compliance requirements. This monitoring equipment is generally passive and monitors traffic received on a particular port. This approach to monitoring does not work well in today's environment. One reason for this is that applications, which in the past typically limited their traffic to a particular port, no longer do so and, instead, use various ports. Another reason for this is that particular ports, which in the past typically were dedicated to traffic of particular applications, now receive traffic of various applications.

SUMMARY

According to one implementation, a device, connected to a monitoring appliance, may include a traffic analyzer to receive a data unit and identify a traffic flow associated with the data unit. The device may also include a traffic processor to receive the data unit and information regarding the identified traffic flow from the traffic analyzer, determine that the identified traffic flow is to be monitored by the monitoring appliance, change a port number, associated with the data unit, to a particular port number to create a modified data unit when the identified traffic flow is to be monitored by the monitoring appliance, and send the modified data unit to the monitoring appliance.

According to another implementation, a method, performed by a device that is connected to a monitoring appliance, may include storing, as entries in a table, information identifying a number of traffic flows and a corresponding number of port numbers, where one of the entries stores information identifying one of the traffic flows and a corresponding one of the port numbers; receiving a data unit; identifying a traffic flow associated with the data unit; determining that information associated with the identified traffic flow matches the one of the traffic flows in the table; replacing a port number, associated with the data unit, with the corresponding one of the port numbers from the table to create a modified data unit when the information associated with the identified traffic flow matches the one of the traffic flows in the table; and sending the modified data unit to the monitoring appliance.

According to yet another implementation, a device, connected to a monitoring appliance, may include means for receiving network traffic associated with communication between a client and a server, where the network traffic includes a number of different traffic flows tunneled via a common transport protocol; means for separating the different traffic flows from the network traffic to create a number of separate traffic flows; means for identifying each of the separate traffic flows; means for determining that the monitoring appliance is configured to monitor one of the separate traffic flows; means for replacing a port number, associated with the one of the separate traffic flows, with a particular port number to create a modified traffic flow when the monitoring appliance is configured to monitor the one of the separate traffic flows; and means for sending the modified traffic flow to the monitoring appliance.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1:
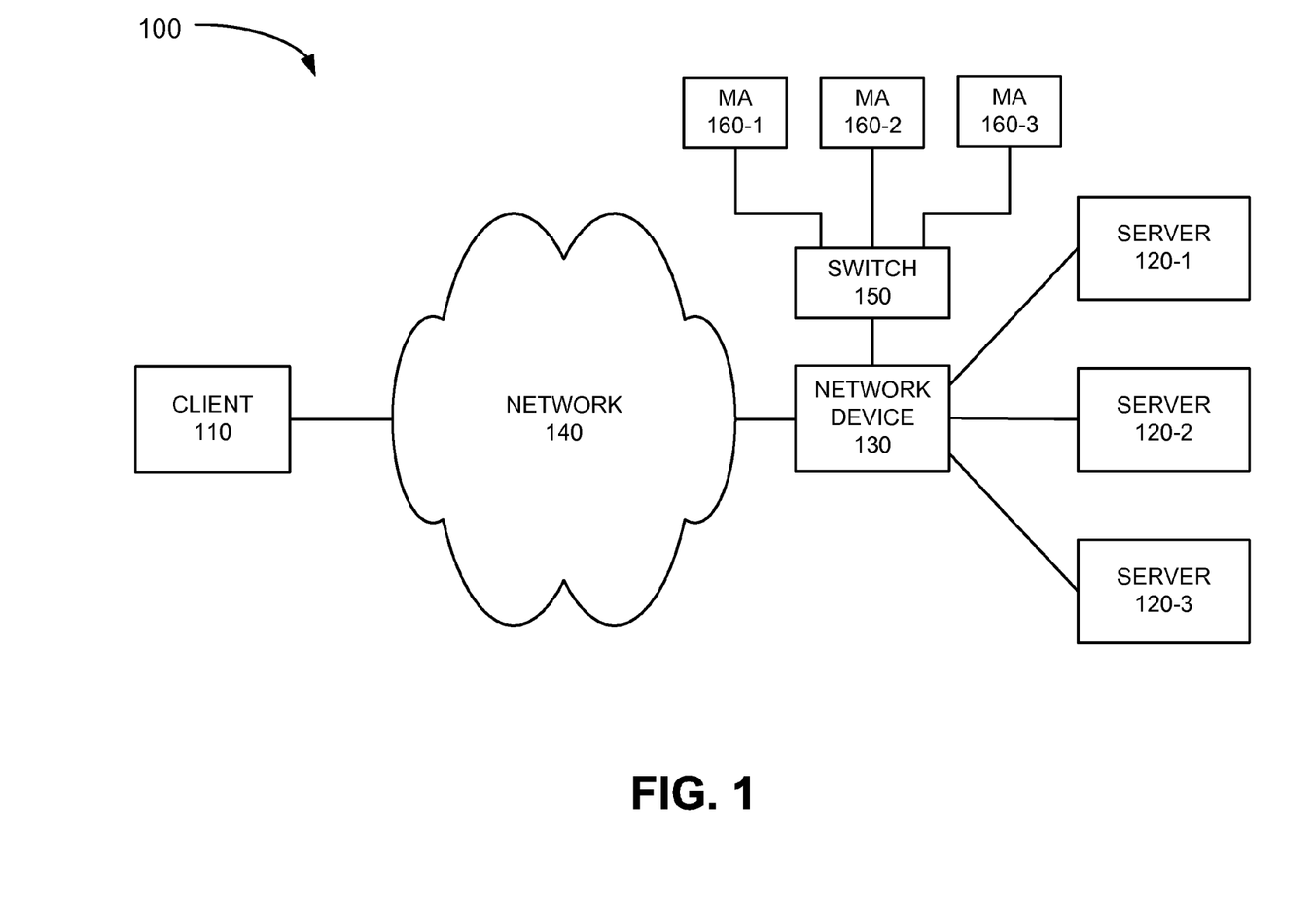
FIG. 1 is a diagram of an exemplary environment in which systems and methods described herein may be implemented.

FIG. 1 is a diagram of an exemplary environment 100 in which systems and methods described herein may be implemented. Environment 100 may include a client 110 connected to a set of servers 120-1, 120-2, and 120-3 (collectively referred to as "servers 120," and individually as "server 120") via a network device 130, and a network 140. Environment 100 may also include a switch 150 connected to network device 130 and to a set of monitoring appliances (MAs) 160-1, 160-2, and 160-3 (collectively referred to as "monitoring appliances 160," and individually as "monitoring appliance 160"). The exemplary number and configuration of components illustrated in FIG. 1 is provided for simplicity. In practice, environment 100 may include more, fewer, different, and/or differently-arranged components than illustrated in FIG. 1. For example, each of monitoring appliances 160 may connect directly to an interface of network device 130, rather than connecting to network device 130 via switch 150. Also, some functions described as being performed by one component may be performed by a different component or a combination of components.

Client 110 may include a device, such as a personal computer, a laptop computer, a personal digital assistant (PDA), a wireless telephone, or another type of computation or communication device. Client 110 may communicate with server 120 over network 140 via wired and/or wireless connections.

Servers 120 may each include a server device, such as a computer device, that may provide client 110 with access to various resources in environment 100. In one implementation, the network resources reside on servers 120. In another implementation, the network resources may be located externally with respect to servers 120.

Network device 130 may include a firewall device, an intrusion detection system, a router, a switch, another type of device that may process and/or forward network traffic, or a combination of one or more of these devices. In an exemplary implementation, network device 130 may identify a traffic flow associated with network traffic to and/or from servers 120 and determine whether, based on the traffic flow, to forward the network traffic to one or more of monitoring appliances 160. The term "traffic flow," as used herein, may refer to an application or protocol with which network traffic is associated. For example, network traffic may be associated with a HyperText Transfer Protocol (HTTP) traffic flow, a session initiation protocol (SIP) traffic flow, a structured query language (SQL) traffic flow, a voice over Internet protocol (VoIP) traffic flow, or some other form of application or protocol.

Network 140 may include one or more networks, such as a wide area network (WAN) (e.g., the Internet), a local area network (LAN), a metropolitan area network (MAN), a telephone network (e.g., the Public Switched Telephone Network (PSTN) or a cellular network), a satellite network, or a combination of networks.

Switch 150 may include a switching device that may receive data from network device 130 and provide the data to an appropriate one or more of monitoring appliances 160. Monitoring appliances 160 may each include a computer device that may monitor network traffic. Different monitoring appliances 160 may monitor different types of network traffic for different purposes. For example, a monitoring appliance 160 may monitor web activity regarding a particular web site. Another monitoring appliance 160 may act as a net recorder that records traffic and analyzes the traffic for some kind of event or data. Yet another monitoring appliance 160 may track client interaction with a server (or a set of servers) to track client selections, system response times, etc. Other monitoring appliances 160 may monitor other types of network traffic.

Exemplary Network Device Architecture

Figure 2:
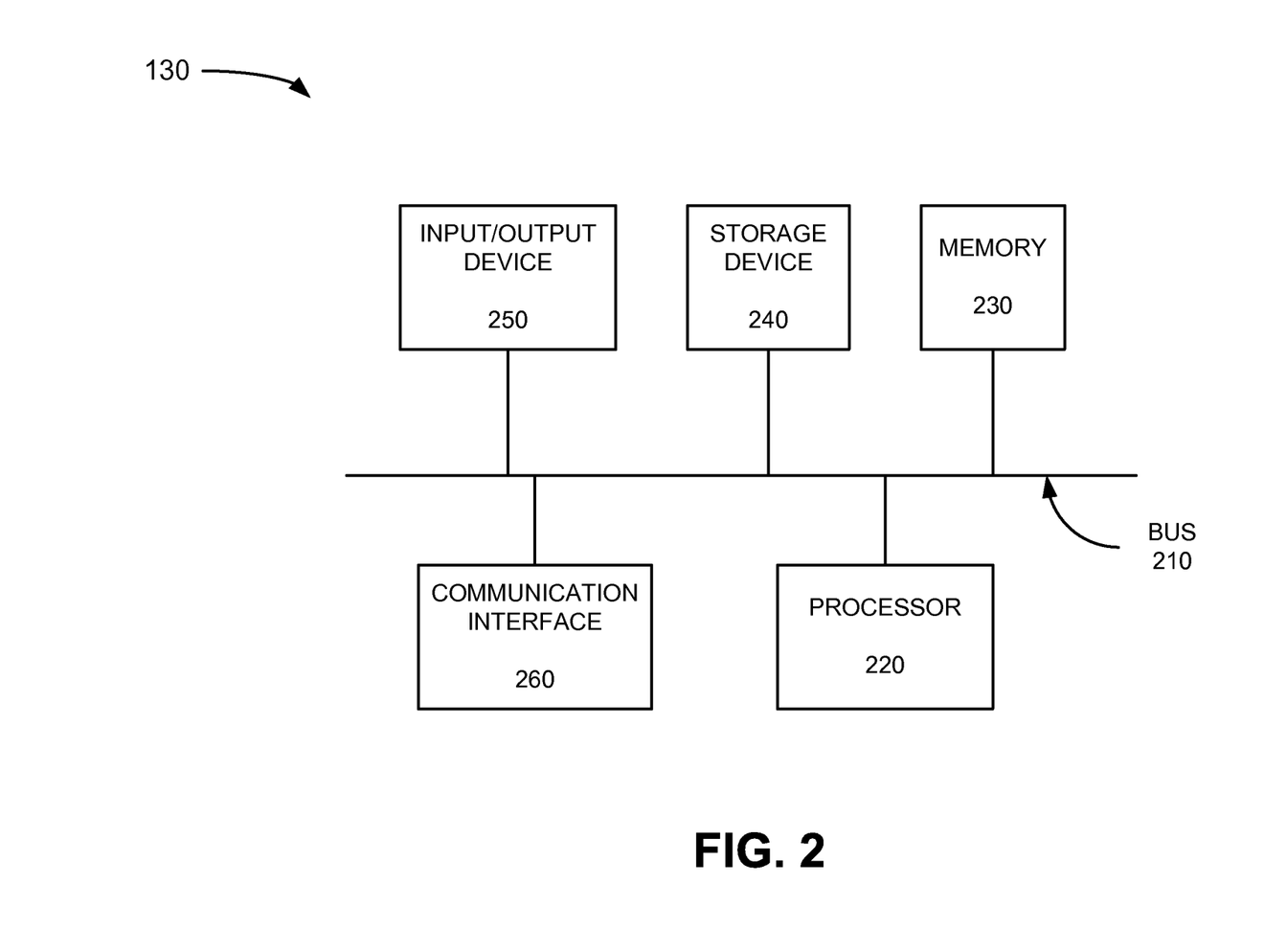
FIG. 2 is a diagram illustrating exemplary components of the network device of FIG. 1.

FIG. 2 is a diagram illustrating exemplary components of network device 130. As shown in FIG. 2, network device 130 may include a bus 210, a processor 220, a memory 230, a storage device 240, an input/output device 250, and a communication interface 260. In other implementations, network device 130 may include additional, fewer, different, or differently-arranged components.

Bus 210 may include a path that permits communication among the components of network device 130. Processor 220 may include a processor, a microprocessor, an application specific integrated circuit (ASIC), a field programmable gate array (FPGA), or another type of processing logic that may interpret and execute instructions. Memory 230 may include a random access memory (RAM) or another type of dynamic storage device that may store information and/or instructions for execution by processor 220; a read only memory (ROM) or another type of static storage device that may store static information and/or instructions for use by processor 220; and/or another type of memory, such as cache or flash memory. Storage device 240 may include a recording medium to store data that may be used by processor 220.

Input/output device 250 may include a mechanism that permits an operator to input information to network device 130, such as a button, a keyboard, a keypad, or the like; and/or a mechanism that outputs information to the operator, such as a light emitting diode (LED), a display, or the like.

Communication interface 260 may include any transceiver-like mechanism(s) that enables network device 130 to communicate with other devices and/or systems. For example, communication interface(s) 260 may include one or more interfaces to a local network (e.g., a LAN) and/or one or more interfaces to a wide area network (e.g., the Internet). In one implementation, communication interface(s) 260 may include an Ethernet interface.

Network device 130 may perform processes associated with identifying traffic for transmission to monitoring appliances, as described in detail below. According to an exemplary implementation, network device 130 may perform these operations in response to processor 220 executing sequences of instructions contained in a computer-readable medium, such as memory 230. A computer-readable medium may be defined as a physical or logical memory device. A logical memory device may refer to memory space within a single, physical memory device or spread across multiple, physical memory devices.

The software instructions may be read into memory 230 from another computer-readable medium, such as storage device 240, or from another device via communication interface(s) 260. The software instructions contained in memory 230 may cause processor 220 to perform processes that will be described later. Alternatively, hardwired circuitry may be used in place of, or in combination with, software instructions to implement processes described herein. Thus, implementations described herein are not limited to any specific combination of hardware circuitry and software.

Figure 3:
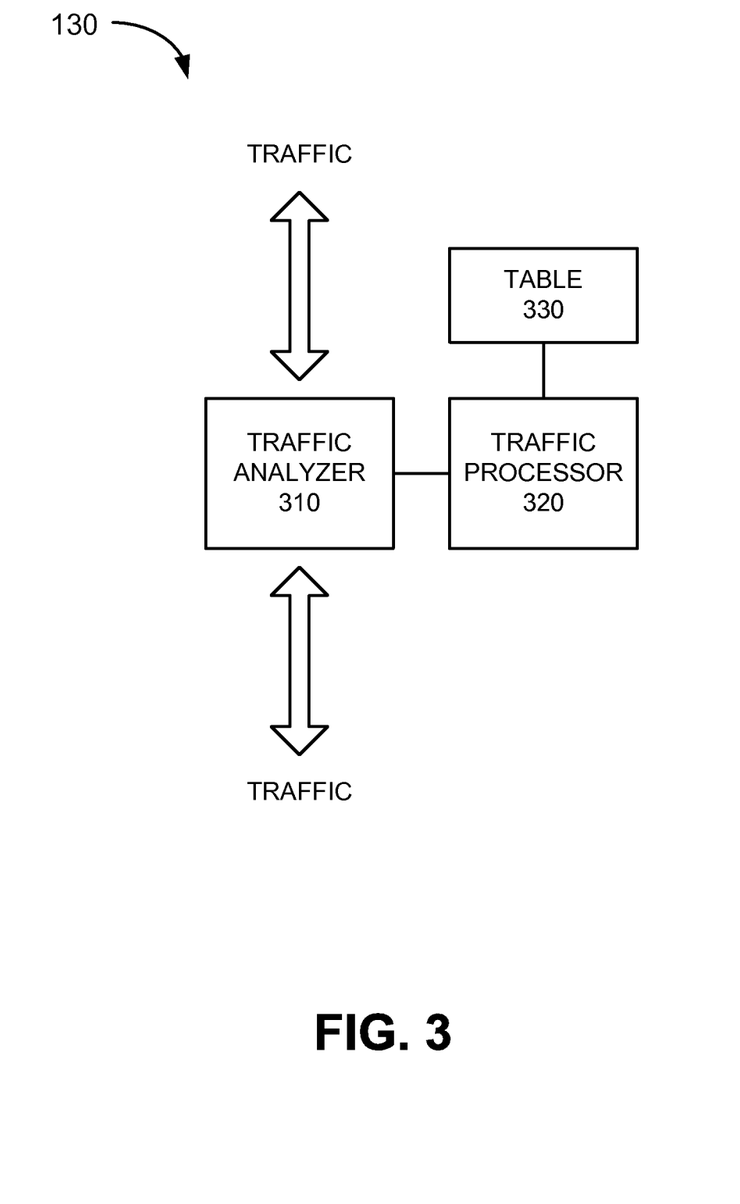
FIG. 3 is a diagram of exemplary functional components of the network device of FIG. 1.

FIG. 3 is a diagram of exemplary functional components of network device 130. As shown in FIG. 3, network device 130 may include a traffic analyzer 310, a traffic processor 320, and a table 330. The functional components shown in FIG. 3 may be implemented by hardware (e.g., processor 220) or a combination of hardware and software. While a particular number and arrangement of components are shown in FIG. 3, in other implementations, network device 130 may include fewer, additional, different, or differently-arranged components.

Traffic analyzer 310 may receive network traffic in the form of packets. While packets will be used in the description below, implementations described herein may apply to any form of data unit either in the form of packets or non-packets. Generally, traffic analyzer 310 may inspect each received packet and identify the traffic flow with which the received packet is associated. In some situations, multiple traffic flows can be tunneled (layered) via a common transport protocol, such as HTTP (e.g., SQL over HTTP). In these situations, traffic analyzer 310 may separate, or demultiplex, the different traffic flows for further processing, as will be described below. Traffic analyzer 310 may provide the packet and information regarding the identified traffic flow to traffic processor 320.

Traffic processor 320 may operate upon the traffic flows identified by traffic analyzer 310 to determine whether these are traffic flows that are to be monitored by monitoring appliances 160. Traffic processor 320 may make its determination using, for example, the information in table 330. In some situations, traffic processor 320 may perform port translation. Port translation may refer to the act of changing port number information in a received packet (e.g., in a header of the received packet).

In the situation where multiple traffic flows are tunneled (layered) via a common transport protocol, such as HTTP (e.g., SQL over HTTP), the format of the data in these traffic flows may differ from a native format of these traffic flows. Generally, monitoring appliances 160 are configured to listen for and process traffic flows in their native formats. Traffic processor 320 may convert (e.g., transcode) the format of a traffic flow, to be monitored, to the native format of the traffic flow. Thus, when traffic processor 320 provides the traffic flow to a monitoring appliance 160, traffic processor 320 may send packets of the traffic flow to monitoring appliance 160 in the format in which monitoring appliance 160 expects to receive the packets.

Table 330 may include information on the traffic flows that require monitoring by monitoring appliances 160. Table 330 may also include information that indicates whether port translation is required for a particular monitored traffic flow. In some situations, a monitoring appliance 160 may be configured to monitor a particular type of traffic flow (e.g., a HTTP traffic flow) sent to a particular port (e.g., port 80). This type of traffic flow (e.g., HTTP traffic flow) may not necessarily be sent only to that particular port. The traffic flow (e.g., HTTP traffic flow) that was sent to another port may be ignored by monitoring appliance 160. Table 330 may require port translation in these situations so that all traffic flow of this type (e.g., HTTP traffic flow) provided to monitoring appliance 160 indicates the particular port expected by monitoring appliance 160 (e.g., port 80).

Figure 4:
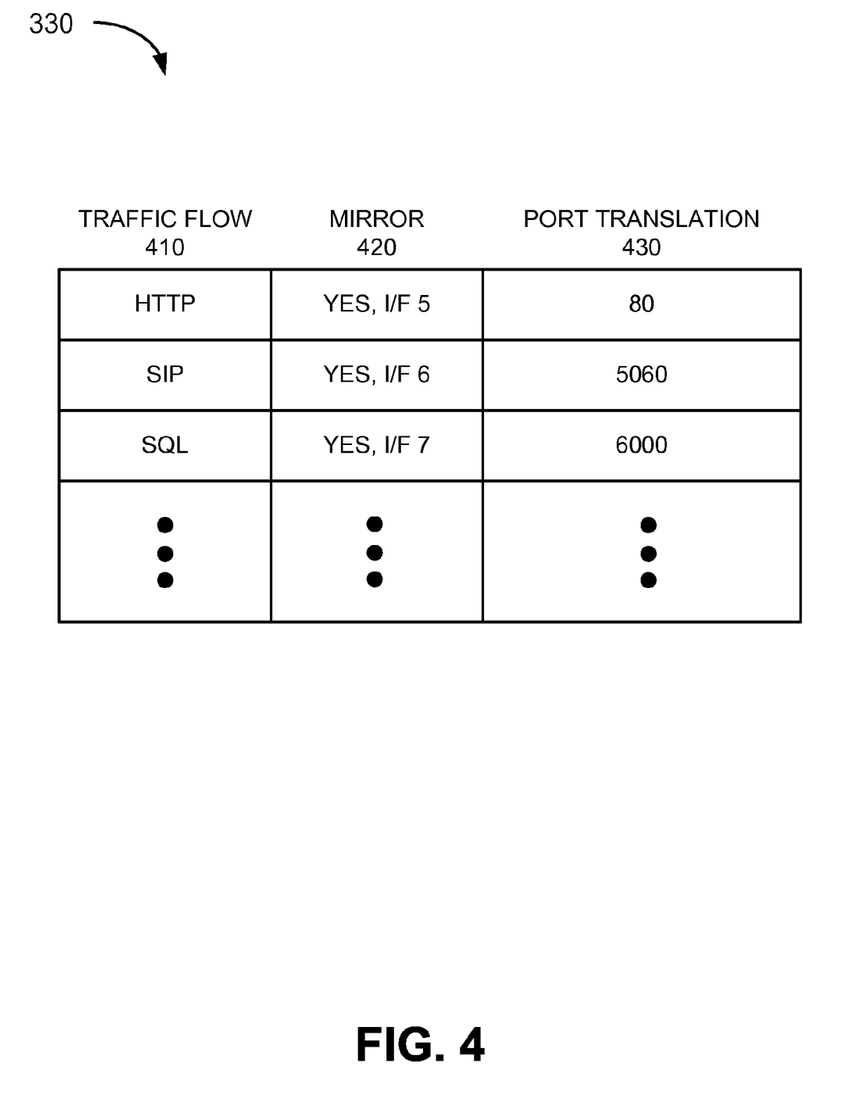
FIG. 4 is a diagram of an exemplary implementation of the table of FIG. 3.

FIG. 4 is a diagram of an exemplary implementation of table 330. As shown in FIG. 4, table 330 may include a traffic flow field 410, a mirror field 420, and a port translation field 430. In other implementations, table 330 may include fewer, additional, or different fields. The fields of table 330 may be user-configurable.

Traffic flow field 410 may include information regarding different types of traffic flows that monitoring appliances 160 are configured to monitor. As shown in FIG. 4, an exemplary traffic flow field 410 may identify SIP as a traffic flow that a monitoring appliance 160 is configured to monitor. Mirror field 420 may indicate whether a traffic flow is to be mirrored (e.g., copied and sent) to a monitoring appliance 160 and may identify an interface port (on network device 130) to which to transmit the traffic flow. As shown in FIG. 4, an exemplary mirror field 420 may indicate YES (indicating that the traffic flow is to be mirrored to a monitoring appliance 160) and I/F 6 (indicating that the traffic flow is to be transmitted to interface port 6 of network device 130). Port translation field 430 may include information regarding a port number. Mirrored packets, associated with the traffic flow, may be modified to replace the port number, included in the header of the packets, with the port number in port translation field 430. If the port numbers are the same, then this may indicate that no port translation is necessary. As shown in FIG. 4, an exemplary port translation field 430 may identify port 5060 (indicating that port translation is to be performed to port 5060).

Exemplary Traffic Analyzer

Figure 5:
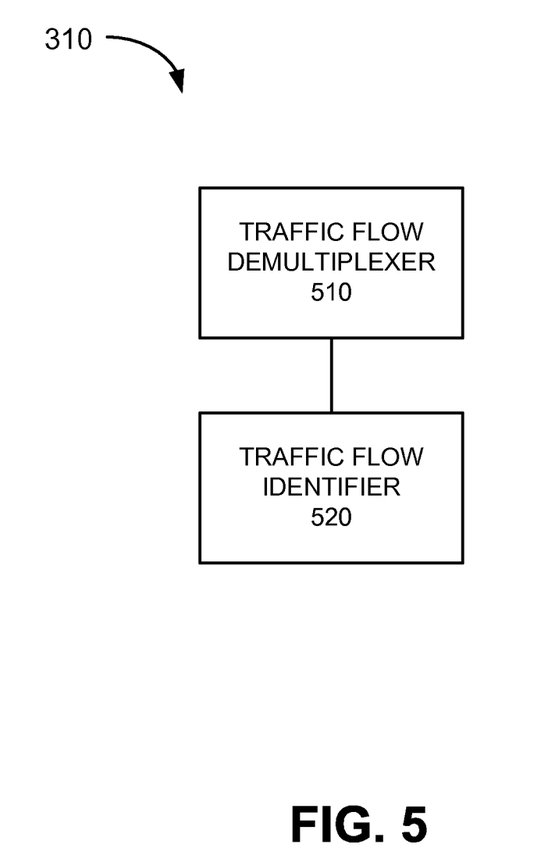
FIG. 5 is a diagram of exemplary functional components of the traffic analyzer of FIG. 3.

FIG. 5 is a diagram of exemplary functional components of traffic analyzer 310. As shown in FIG. 5, traffic analyzer 310 may include a traffic flow demultiplexer 510 and a traffic flow identifier 520. In other implementations, traffic analyzer 310 may include fewer, additional, different, or differently-arranged components.

Traffic flow demultiplexer 510 may receive network traffic and provide information regarding a traffic flow to traffic flow identifier 520. If the network traffic includes multiple, different traffic flows (e.g., multiple traffic flows can be tunneled (layered) via a common transport protocol), traffic flow demultiplexer 510 may separate the different traffic flows. Traffic flow demultiplexer 510 may perform deep packet inspection to separate the traffic flows contained in the network traffic. For example, traffic flow demultiplexer 510 may examine packet headers and/or payloads to separate the different traffic flows. Traffic flow demultiplexer 510 may provide information regarding the different traffic flows to traffic flow identifier 520.

Figure 6:
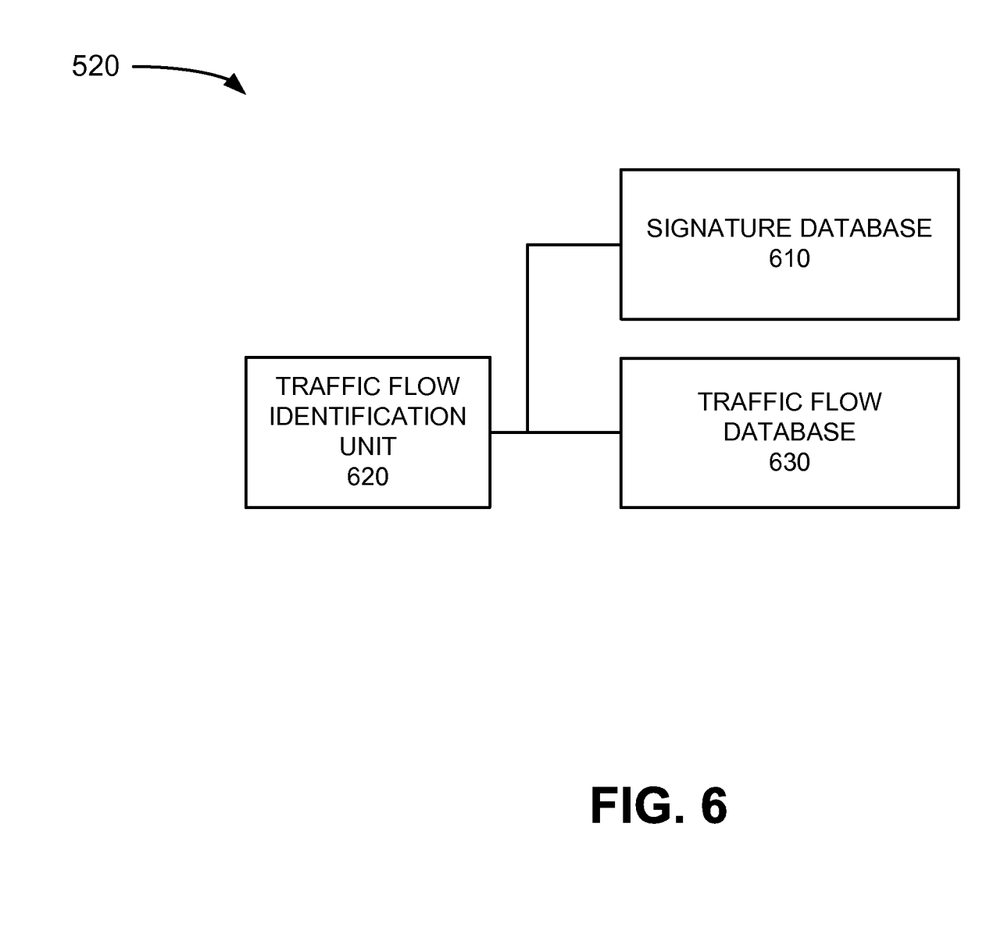
FIG. 6 is a diagram of exemplary functional components of the traffic flow identifier of FIG. 5.

Traffic flow identifier 520 may identify the particular traffic flow(s) from traffic flow demultiplexer 510. FIG. 6 is a diagram of exemplary functional components of traffic flow identifier 520. As shown in FIG. 6, traffic flow identifier 520 may include signature database 610, traffic flow identification unit 620, and traffic flow database 630. In other implementations, traffic flow identifier 520 may include fewer, additional, different, or differently-arranged components.

Signature database 610 may store information associated with various traffic flows that may traverse network device 130. As described above, these traffic flows may be associated with different applications and/or protocols. In an exemplary implementation, signature database 610 may store signature information associated with various traffic flows, along with information identifying the particular traffic flow. The terms "signature information" and "signature," as used herein, may refer to characteristic information identifying, for example, data patterns, strings, expressions, etc., that are associated with various data flows and that may be used to identify specific data flows. Alternatively, or additionally, the signature information may include statistical information, such as packet lengths, inter-packet arrival times, etc.

Traffic flow identification unit 620 may include logic that may receive network traffic transmitted in network 140, such as data transmitted from client 110 to server(s) 120, or vice versa, and identify a particular traffic flow associated with this data transmission. For example, traffic flow identification unit 620 may receive one or more packets from client 110, compare information in the packet(s) to information in signature database 610, and identify the traffic flow associated with the packet(s) by matching information in the packet(s) transmitted from client 110 to information in signature database 610.

In an exemplary implementation, traffic flow identification unit 620 may include deterministic finite automaton (DFA) logic and/or perl compatible regular expression (PCRE) logic that may search for a pattern and/or a regular expression (regex) in signature database 610 that matches a signature (e.g., a pattern, expression, string, etc.) in one or more client-to-server (CTS) packets sent from client 110. Traffic flow identification unit 620 may also examine one or more server-to-client (STC) packets sent from server 120 to client 110 to verify the traffic flow associated with the packets.

Traffic flow database 630 may store information identifying traffic flows that may be associated with received packets, along with other information associated with the particular traffic flows. The information in traffic flow database 630 may then be used by traffic flow identification unit 620 to quickly identify a particular traffic flow associated with received packets. In one implementation, traffic flow identification unit 620 may check information associated with the received packet(s) against information in traffic flow database 630 first to determine whether the traffic flow can be identified and, if the traffic flow cannot be identified from traffic flow database 630, traffic flow identification unit 620 may check information associated with the received packet(s) against information in signature database 610 to identify the traffic flow.

Figure 7:
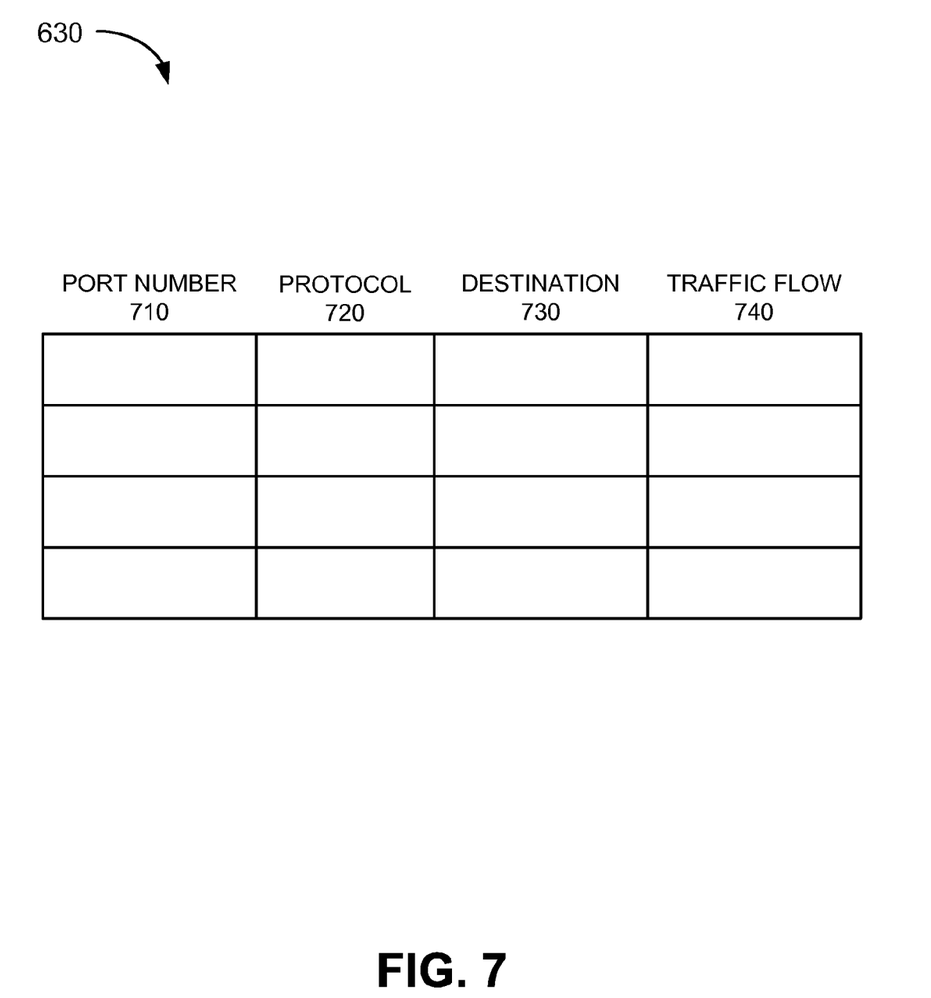
FIG. 7 is a diagram of an exemplary implementation of the traffic flow database of FIG. 6.

FIG. 7 is a diagram of an exemplary implementation of traffic flow database 630. As shown in FIG. 7, traffic flow database 630 may include port number field 710, protocol field 720, destination field 730, and traffic flow field 740. In other implementations, traffic flow database 630 may include fewer, additional, or different fields.

Port number field 710 may include information identifying a destination port number associated with packets in received network traffic. The destination port number may be included in the header of a received packet (e.g., a Transmission Control Protocol/Internet Protocol (TCP/IP) packet) and may identify a destination port on a destination device, such as a destination port on server 120. Protocol field 720 may include information regarding a protocol associated with the packets in received network traffic. The protocol information may also be included in the header of received packets. The protocol information may identify one of any number of protocols used in network communications, such as TCP or user datagram protocol (UDP).

Destination field 730 may include information regarding a destination associated with packets in received network traffic. For example, destination field 730 may identify a destination server, such as server 120. In this case, destination field 730 may include an IP address, such as an IP address associated with server 120 or IP addresses associated with a set of servers 120.

Traffic flow field 740 may identify the particular traffic flow associated with the port number, protocol information, and destination information stored in fields 710, 720, and 730. In an exemplary implementation, once a particular traffic flow, associated with received network traffic, has been identified by traffic flow identification unit 620 (using, for example, information in signature database 610), traffic flow identification unit 620 may store the port number, protocol information, and destination information associated with the network traffic in fields 710, 720, and 730, and may store information identifying the traffic flow in traffic flow field 740.

Exemplary Process

Figure 8:
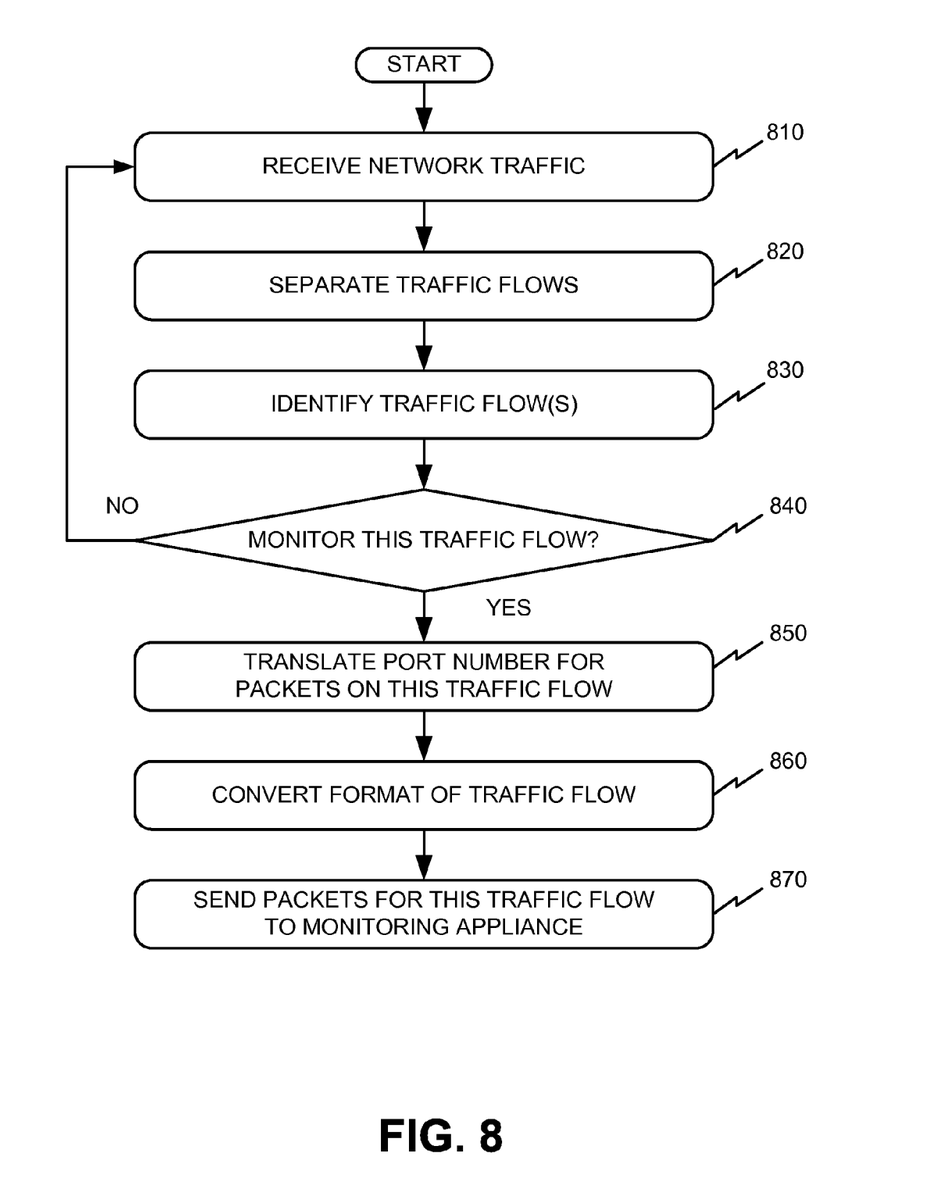
FIG. 8 is a flowchart illustrating an exemplary process for providing network traffic to a monitoring appliance.

FIG. 8 is a flowchart illustrating an exemplary process for providing network traffic to a monitoring appliance. The process of FIG. 8 may be performed by one or more components of network device 130. In another implementation, the process of FIG. 8 may be performed by a device separate from or in conjunction with network device 130.

The process of FIG. 8 may begin with network traffic being received (block 810). For example, traffic analyzer 310 may receive a packet from a client, such as client 110, for transmission to a server, such as server 120. Assume that client 110 is requesting a resource from server 120 and sends one or more packets to server 120 that is/are received by traffic analyzer 310 of network device 130.

The traffic flows included in the received network traffic may be separated (block 820). In some situations, the network traffic may include data associated with multiple, different traffic flows. In these situations, as previously described, traffic analyzer 310 may perform deep packet inspection to identify the parts of the network traffic associated with these different traffic flows. For example, traffic analyzer 310 may analyze information in a packet header and/or payload to separate the different traffic flows. In other situations, the network traffic may include data associated with only a single traffic flow. In these situations, traffic analyzer 310 may not need to perform block 820.

The traffic flow included in the received network traffic may be identified (block 830). For example, traffic analyzer 310 may examine one or more packets from client 110 to identify the traffic flow associated with the packet(s). As described above, traffic flow identification unit 620 may receive one or more CTS packets from client 110 and compare information in the received CTS packet(s) to information in signature database 610 to attempt to identify the traffic flow associated with the packet(s). In an exemplary implementation, traffic flow identification unit 620 may identify the traffic flow by performing a pattern matching algorithm, such as a DFA algorithm, a PCRE algorithm, or another algorithm to identify patterns, expressions, strings, etc., used in the communication from client 110 that match or correspond to a signature stored in signature database 610. For example, traffic flow identification unit 620 may search signature database 610 using the initial CTS packet from client 110 for a pattern or regex that matches a pattern or expression included in the CTS communication.

In one alternative implementation, traffic flow identification unit 620 may examine one or more packets in the CTS communication to identify particular information associated with the communication. For example, traffic flow identification unit 620 may identify the destination port number, protocol, and/or destination device (e.g., destination IP address) associated with the communication from client 110. This information may be included in the header of the initial CTS packet from client 110.

Traffic flow identification unit 620 may then use the identified destination port number, protocol, and/or destination device to search traffic flow database 630 for an entry in which fields 710, 720, and 730 match the identified destination port number, protocol, and destination device, respectively. If a match is found, traffic flow identification unit 620 may identify the traffic flow stored in traffic flow field 740 for the matching entry. In the event that a match is not found, traffic flow identification unit 620 may identify the traffic flow using signature database 610.

In some situations, traffic analyzer 310 may be able to identify the traffic flow from information in a single packet. In other situations, traffic analyzer 310 may need information from multiple packets to be able to identify the traffic flow. For example, traffic analyzer 310 may process an initial packet, tentatively identify the packet as being associated with a particular traffic flow, store a copy of the packet, and transmit the packet towards its destination. When traffic analyzer 310 receives a response packet to the initial packet, as an initial STC packet, traffic analyzer 310 may confirm the tentative identification of the traffic flow.

It may be determined whether a monitoring appliance is configured to monitor this traffic flow (block 840). It may be determined that a monitoring appliance 160 is configured to monitor a traffic flow when there is an entry in table 330 corresponding to that traffic flow. If the traffic flow corresponds to a SQL traffic flow, for example, traffic processor 320 may determine whether table 330 includes an entry that identifies SQL in traffic flow field 410 (FIG. 4). If no monitoring appliance 160 is configured to monitor this traffic flow (block 840—NO), then the process may return to block 810 to process additional received network traffic.

If a monitoring appliance is configured to monitor this traffic flow (block 840—YES), then the port number for packets on this traffic flow may be translated (block 850). For example, traffic processor 320 may read information from port translation field 430 (FIG. 4) in the appropriate entry in table 330. Traffic processor 320 may replace the port number in packets, associated with this traffic flow, with the port number from port translation field 430. If these port numbers match, then traffic processor 320 need not actually perform the port number translation.

In the situation where multiple traffic flows are tunneled (layered) via a common transport protocol, the format of a traffic flow, to be monitored, may be converted to the native format of the traffic flow (block 860). For example, traffic processor 320 may use a known transcoding technique to convert the format of the traffic flow to the native format.

The packets, associated with this traffic flow, may be sent to the appropriate monitoring appliance (block 870). For example, traffic processor 320 may read information from mirror field 420 (FIG. 4) in the appropriate entry in table 330. From mirror field 420, traffic processor 320 may identify an interface port via which to send packets associated with this traffic flow. This interface port may correspond to an interface port of network device 130.

EXAMPLE

Figure 9:
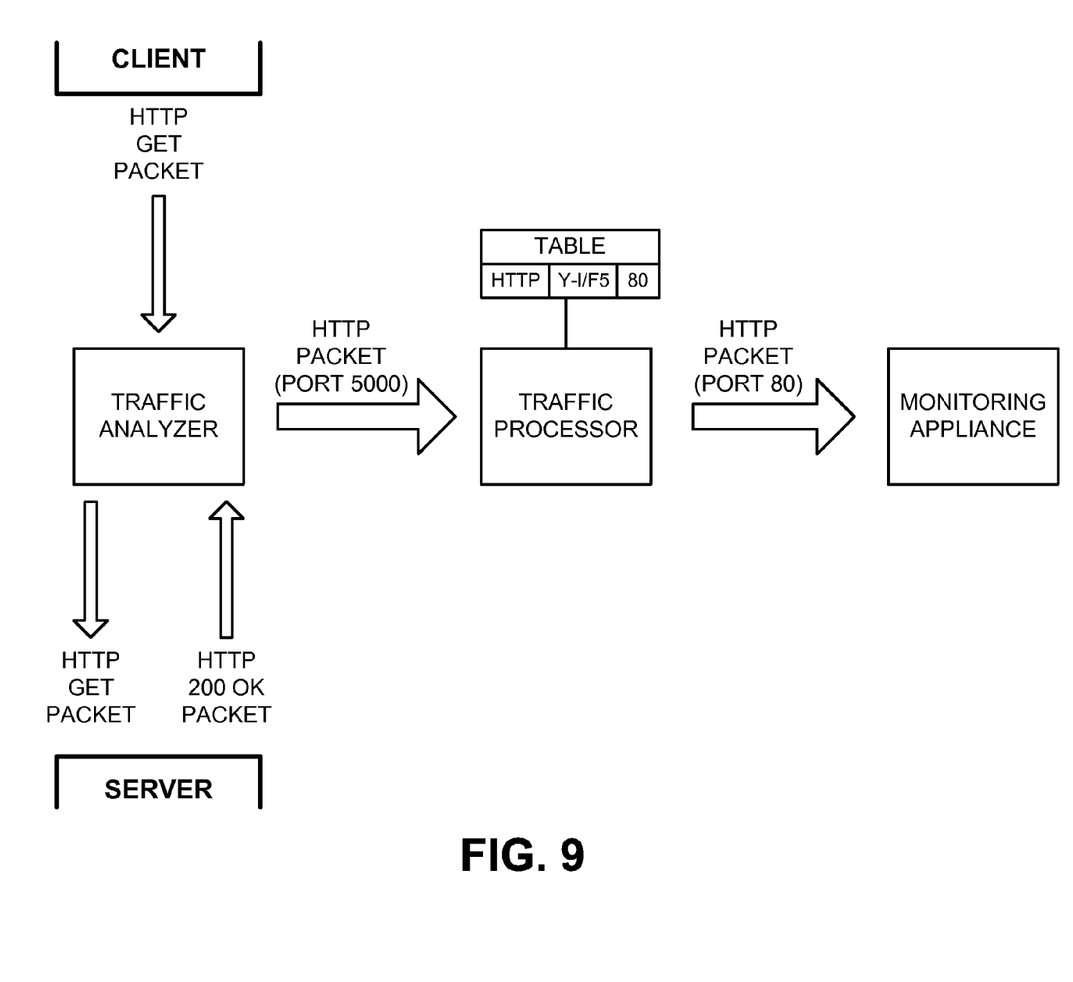
FIG. 9 is a diagram illustrating an example of a concept described herein.

FIG. 9 is a diagram illustrating an example of a concept described herein. As shown in FIG. 9, assume that a monitoring appliance is configured to monitor HTTP traffic that is sent to port 80. As a result, an entry may be stored in the table that identifies HTTP traffic in the traffic flow field, indicates that the HTTP packets are to be mirrored to interface port 5, and indicates that the port number in the HTTP packets is to be translated to port 80 (i.e., the port that the monitoring appliance expects).

Assume that the traffic analyzer receives an initial HTTP packet (e.g., a HTTP GET packet) from a client and that the packet includes a port number of 5000. The traffic analyzer may process the packet. Assume that, in this case, the traffic analyzer cannot positively identify the packet as a HTTP packet. As a result, the traffic analyzer may store a copy of the packet and transmit the packet towards its destination (i.e., towards the server).

The server may receive the packet and process the packet. If the server determines that the packet is a valid HTTP packet, the server may respond by transmitting a response HTTP packet (e.g., a HTTP 200 OK packet) to the client. The traffic analyzer may receive the packet from the server and process the packet. Assume that the traffic analyzer determines, based on the initial packet (i.e., HTTP GET packet) and the response packet (i.e., the HTTP 200 OK packet), that the packets are HTTP packets associated with a HTTP traffic flow. The traffic analyzer may send the HTTP packets to the traffic processor, along with information identifying these packets as associated with a HTTP traffic flow. The traffic analyzer may also transmit the response packet to the client.

The traffic processor may determine whether the monitoring appliance is configured to monitor HTTP packets. In this case, the traffic processor determines that the monitoring appliance is configured to monitor HTTP packets because the table stores an entry indicating that HTTP packets are packets that should be mirrored and have their port numbers translated. In this case, the HTTP packet from the client included a port number of 5000. The traffic processor may replace the port number of 5000 with the port number of 80, as indicated in the table entry. The traffic processor may then transmit the packet to the monitoring appliance via interface port 5.

The monitoring appliance may receive the HTTP packet and perform some kind of operation on the packet. For example, the monitoring appliance may gather statistics, record activity, and/or analyze the packet for security purposes.

CONCLUSION

Communication trends continue to change today. For example, network traffic that has conventionally been transmitted to a particular port is now commonly transmitted via various ports. Also, standard ports may carry all kinds of traffic, including traffic that is unrelated to the traffic that conventionally has been transmitted to these ports. For example, SIP traffic has conventionally been transmitted to port 5060. Some devices may transmit SIP traffic to a port other than port 5060. Some devices may also transmit traffic other than SIP traffic to port 5060. This unconventional behavior may make it difficult to efficiently monitor network traffic.

Monitoring appliances perform detailed and processor-intensive operations on packets. Implementations described herein make efficient use of the monitoring appliances by sending the monitoring appliances only that traffic that the monitoring appliances are configured to monitor regardless of the ports to which this traffic is transmitted.

There has also been another communication trend in which multiple types of traffic are being tunneled (layered) via a common transport mechanism, such as HTTP. This may make it difficult to monitor the traffic being tunneled via the common transport mechanism. Implementations described herein may separate these different types of traffic from the common transport mechanism into different sub-streams and convert the formats of the data in the sub-streams into their native formats so that these sub-streams of traffic can be processed by the monitoring appliances.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 8, the order of the blocks may be modified in other implementations. Further, non-dependent blocks may be performed in parallel.

Also, certain aspects have been described as being implemented as "logic" that performs one or more functions. This logic may include hardware, such as a processor, microprocessor, an ASIC, or a FPGA, or a combination of hardware and software, such as a processor/microprocessor executing instructions stored in a memory. Similarly, the term "component" may refer to hardware or a combination of hardware and software.

Further, the term "table," as used herein, may refer to any searchable form or arrangement of data within a memory.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
determine that a traffic flow associated with received data is not identified,
store, based on the traffic flow not being identified, a copy of the data,
transmit the data from a first port of the device,
receive other data based on the transmitting of the data from the device,
identify the traffic flow associated with the data based on the other data,
determine that the identified traffic flow comprises a particular type of traffic flow to be monitored,
mirror the data, to form mirrored data, based on the identified traffic flow comprising the particular type of traffic flow,
modify the mirrored data to cause the mirrored data to be associated with a second port of the device,
the second port being different from the first port, and
transmit, via the second port, the mirrored data to a monitoring appliance that is configured to monitor the particular type of traffic flow.

2. The device of claim 1, where, when determining that the traffic flow is not identified, the one or more processors are to:
compare information included in the received data to one or more signatures of traffic flows stored in a memory associated with the device, and
determine that the traffic flow is not identified based on comparing the information included in the received data to the one or more signatures of traffic flows.

3. The device of claim 1, where, when determining that the traffic flow is not identified, the one or more processors are to:
perform a pattern matching algorithm on the data to identify a pattern,
determine that the identified pattern does not correspond to a signature of a traffic flow,
the signature of the traffic flow being stored in a memory associated with the device, and
determine that the traffic flow is not identified based on the identified pattern not corresponding to the signature of the traffic flow.

4. The device of claim 3, where the pattern matching algorithm comprises one of:
a deterministic finite automaton (DFA) algorithm,
a perl compatible regular expression (PCRE) algorithm, or
a regular expression algorithm.

5. The device of claim 1, where the one or more processors are further to:
identify the data as being associated with the particular traffic flow when the traffic flow is not determined, and
where, when identifying the traffic flow associated with the data based on the other data, the one or more processors are to:
confirm the identification of the data with the particular traffic flow based on the other data.

6. The device of claim 1, where, when modifying the mirrored data, the one or more processors are to:
determine that the data is associated with the monitoring appliance,
modify the mirrored data to cause the mirrored data to be associated with the second port based on the data being associated with the monitoring appliance.

7. The device of claim 1, where, when identifying the traffic flow associated with the data based on the other data, the one or more processor are to:
identify at least one of a pattern, an expression, or a string based on information included in the other data, and
determine that the identified at least one of the pattern, the expression, or the string corresponds to a signature of the traffic flow associated with the data.

8. A non-transitory computer-readable medium storing instructions, the instructions comprising:
one or more instructions which, when executed by at least one processor, cause the at least one processor to determine that a traffic flow associated with received data is not identified;
one or more instructions which, when executed by the at least one processor, cause the at least one processor to store, based on the traffic flow not being identified, a copy of the data;
one or more instructions which, when executed by the at least one processor, cause the at least one processor to transmit, via a first port, the data to a destination;
one or more instructions which, when executed by the at least one processor, cause the at least one processor to receive other data after transmitting the data to the destination;
one or more instructions which, when executed by the at least one processor, cause the at least one processor to determine that the other data is associated with a particular type of traffic flow;
one or more instructions which, when executed by the at least one processor, cause the at least one processor to mirror the data, to form mirrored data, based on the other data being associated with the particular type of traffic flow;
one or more instructions which, when executed by the at least one processor, cause the at least one processor to modify the mirrored data to cause the mirrored data to be associated with a second port of the device,
the second port being different from the first port; and
one or more instructions which, when executed by the at least one processor, cause the at least one processor to transmit the mirrored data to a monitoring appliance that is configured to monitor the particular type of traffic flow.

9. The non-transitory computer-readable medium of claim 8, where the instructions further comprise:
one or more instructions which, when executed by the at least one processor, cause the at least one processor to store information associated with a plurality of types of traffic flows,
the plurality of types of traffic flows including the particular type of traffic flow; and
where the one or more instructions to determine that the traffic flow is not identified include:
one or more instructions which, when executed by the at least one processor, cause the at least one processor to determine that information included in the data does not match information associated with one of the plurality of types of traffic flows, and
one or more instructions which, when executed by the at least one processor, cause the at least one processor to determine that the traffic flow is not identified based on determining that the information included in the data does not match the information associated with the one of the plurality of types of traffic flows.

10. The non-transitory computer-readable medium of claim 8, where the one or more instructions to determine that the traffic flow is not identified include:
one or more instructions which, when executed by the at least one processor, cause the at least one processor to apply an algorithm to the data to identify one or more of a pattern, a particular string of data, or a particular expression, and
one or more instructions which, when executed by the at least one processor, cause the at least one processor to determine that the identified one or more of the pattern, the particular string of data, or the particular expression does not match information associated with a monitored type of traffic flow.

11. The non-transitory computer-readable medium of claim 10, where the algorithm comprises one of:
a deterministic finite automaton (DFA) algorithm,
a perl compatible regular expression (PCRE) algorithm, or
a regular expression algorithm.

12. The non-transitory computer-readable medium of claim 8, where the instructions further comprise:
one or more instructions which, when executed by the at least one processor, cause the at least one processor to identify the data as being associated with the particular type of traffic flow based on the traffic flow not being identified; and
one or more instructions which, when executed by the at least one processor, cause the at least one processor to confirm the identification of the type of traffic flow based on the other data being associated with the particular type of traffic flow.

13. The non-transitory computer-readable medium of claim 8, further comprising:
one or more instructions which, when executed by the at least one processor, cause the at least one processor to determine that the data is associated with the first port, where the particular type of traffic flow is associated with the second port; and
where the one or more instructions to modify the mirrored data include:
one or more instructions which, when executed by the at least one processor, cause the at least one processor to modify the mirrored data to cause the mirrored data to be associated with the second port based on the particular type of traffic flow being associated with the second port.

14. The non-transitory computer-readable medium of claim 8, where the instructions further comprise:
one or more instructions which, when executed by the at least one processor, cause the at least one processor to determine whether one or more monitoring appliances, of a plurality of monitoring appliances, are configured to monitor the particular type of traffic flow,
where the plurality of monitoring appliances includes the monitoring appliance; and
where the one or more instructions to form the mirrored data include:
one or more instructions which, when executed by the at least one processor, cause the at least one processor to form the mirrored data when the one or more monitoring appliances are configured to monitor the particular type of traffic flow.

15. A method comprising:
receiving, by a network device, first data;
determining, by the network device, that a traffic flow, associated with the first data, is not identified;
storing, by the network device, a copy of the first data based on determining that the traffic flow is not identified;
transmitting, by the network device and via a first port, the first data from the network device;
receiving, by the network device, second data after transmitting the first data;
identifying, by the network device, the traffic flow associated with the first data based on a traffic flow associated with the second data;
determining, by the network device, that the traffic flow associated with the second data is to be monitored;
modifying, by the network device, the copy of the first data to cause the copy of the first data to be associated with a second different port; and
transmitting, by the network device, the modified copy of the first data to a monitoring appliance based on determining that the traffic flow associated with the second data is to be monitored.

16. The method of claim 15, where said determining that the traffic flow associated with the first data is not identified includes:
determining that information included in a header of the first data does not match a signature of a traffic flow stored in a memory of the network device.

17. The method of claim 15, where said determining that the traffic flow associated with the first data is not identified includes:
performing a pattern matching algorithm on the first data to identify a pattern, and
determining that the identified pattern does not correspond to a signature of a traffic flow,
the signature of the traffic flow being stored in a memory of the network device.

18. The method of claim 17, where the pattern matching algorithm comprises one of:
a deterministic finite automaton (DFA) algorithm,
a perl compatible regular expression (PCRE) algorithm, or
a regular expression algorithm.

19. The method of claim 15, further comprising:
initially identifying the traffic flow associated with the first data as comprising a traffic flow to be monitored based on determining that the traffic flow associated with the first data is not identified; and
confirming that the traffic flow comprises the traffic flow to be monitored based on the other data being associated with the particular type of traffic flow.

20. The method of claim 15, where the monitoring appliance is configured to monitor the second different port, the method further comprising:
determining that the first data is associated with the first port; and
where said modifying the copy of the first data includes:
modifying the copy of the first data to cause the copy of the first data to be associated with the second different port based on the monitoring appliance being configured to monitor the second different port.

* * * * *

UNITED STATES PATENT AND TRADEMARK OFFICE
CERTIFICATE OF CORRECTION

| | | |
|---|---|---|
| PATENT NO. | : 8,619,614 B2 | Page 1 of 1 |
| APPLICATION NO. | : 13/352790 | |
| DATED | : December 31, 2013 | |
| INVENTOR(S) | : Krishna Narayanaswamy et al. | |

It is certified that error appears in the above-identified patent and that said Letters Patent is hereby corrected as shown below:

In the Claims

Please correct claim 5 as follows:

Column 11, line 54, after "associated with" replace "the" with "a".

Please correct claim 16 as follows:

Column 14, line 21, after "where" delete "said".

Please correct claim 17 as follows:

Column 14, line 29, after "where" delete "said".

Please correct claim 20 as follows:

Column 14, line 54, after "second" delete "different";
Column 14, line 59, after "where" delete "said";
Column 14, line 61, after "second" delete "different";
Column 14, line 63, after "second" delete "different".

Signed and Sealed this
Twenty-second Day of July, 2014

Michelle K. Lee
*Deputy Director of the United States Patent and Trademark Office*